United States Patent [19]

Kim

[11] 4,212,125
[45] Jul. 15, 1980

[54] HOOK SETTING FISHING ROD ATTACHMENT

[75] Inventor: Chin K. Kim, Chicago, Ill.

[73] Assignee: Bong Kon Kim, Melrose Park, Ill.; a part interest

[21] Appl. No.: 929,887

[22] Filed: Jul. 31, 1978

[51] Int. Cl.² .............................................. A01K 91/06
[52] U.S. Cl. ..................................................... 43/16
[58] Field of Search ................................ 43/15, 16, 25

[56] References Cited

U.S. PATENT DOCUMENTS

| | | | |
|---|---|---|---|
| 2,590,721 | 3/1952 | Muth | 43/15 |
| 3,055,135 | 9/1962 | Lewis | 43/15 |
| 3,078,609 | 2/1963 | Efird | 43/15 |
| 3,200,530 | 8/1965 | Dworski | 43/16 |
| 3,787,994 | 1/1974 | Love | 43/15 |

*Primary Examiner*—Nicholas P. Godici
*Attorney, Agent, or Firm*—Bernard L. Kleinke

[57] ABSTRACT

A hook setting attachment is adapted to be mounted on a fishing rod and includes a movable member mounted on a fixed elongated member adapted to be attached to the fishing rod. A line attaching device is adapted to connect releasably the fishing line of the fishing rod to the movable member. A main spring urges resiliently the members to an initial position, and a latching device fixes releasably the members in a set position against the force of the main spring. A retaining device holds releasably the latch in its latched position and subsequently permits the latch to restore to its initial position to free the movable member and thus cause it to snap back to its original position under the force of the spring, thereby jerking on the fishing line to set the hook in the mouth of a fish.

10 Claims, 10 Drawing Figures

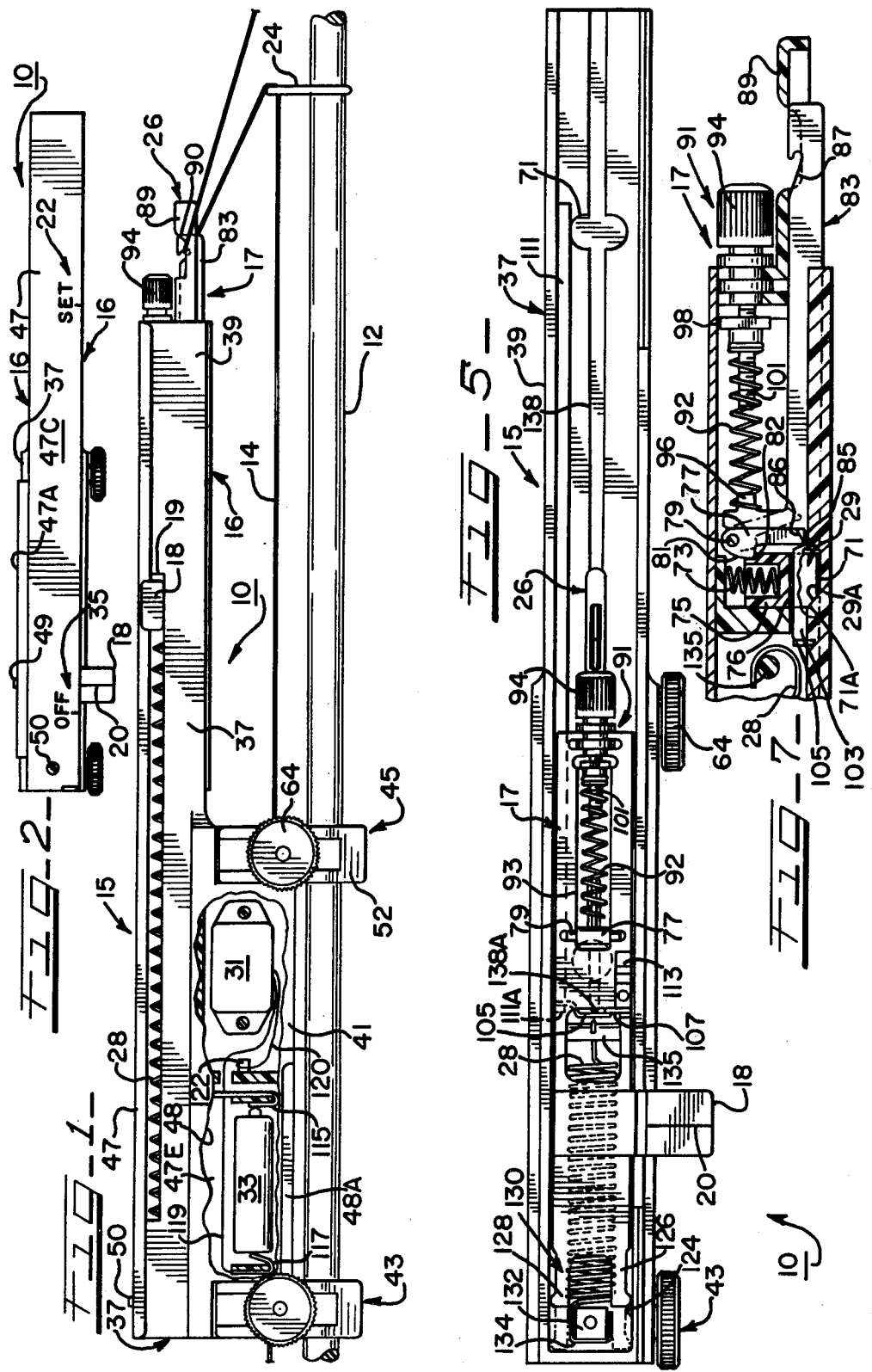

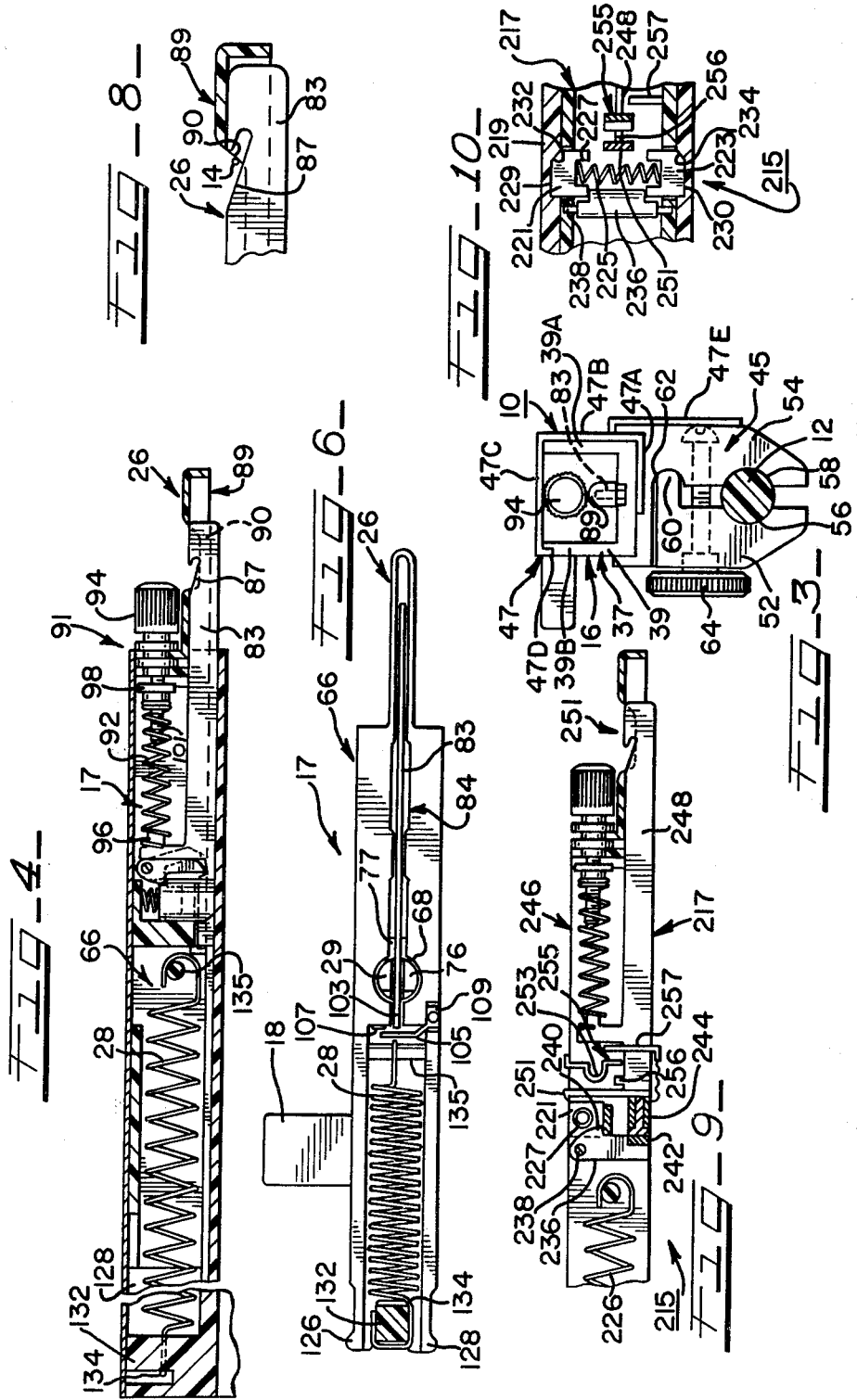

4,212,125

HOOK SETTING FISHING ROD ATTACHMENT

BRIEF SUMMARY OF THE INVENTION

The present invention relates in general to a hook setting fishing rod attachment, and it more particularly relates to a fishing rod attachment for jerking backwardly on the fishing line in response to a forward pulling force applied to the fishing line, such as by a fish taking the bait, to set the fishhook in place in the mouth of the fish.

In my copending U.S. patent application Ser. No. 887,154, filed Mar. 16, 1978, U.S. Pat. No. 4,177,594 entitled "Fishing Rod Attachment and Adjustable Size Spring Therefor", there is disclosed a fishing rod attachment for fishing rods to jerk backwardly in an abrupt manner the fishing line automatically when a fish pulls on the fishhook at the end of the fishing line. The attachment is readily adapted to be mounted on an existing fishing rod or pole. The attachment includes a latching device which fixes releasably a spring loaded movable member in a set position relative to a fixed member mounted on the fishing rod. The fishing line is attachable releasably to the movable member such that when a forward pulling force is applied to the fishing line, the latch is tripped to cause the movable member to snap backwardly to jerk on the fishing line so as to set automatically the hook in the fish's mouth. Thereafter, the fishing line can be quickly and easily freed from the attachment so that the fishing line can be reeled in to retrieve the fish. While such an attachment is highly desirable for many applications, it would be desirable to have such an attachment which would be highly sensitive to even very small size fish taking the bait. In this regard, the latching mechanism of the attachment should be made in such a manner that even a small size fish pulling on the fishing line can trigger the latching mechanism to cause the line to be pulled abruptly for setting the hook. By employing a sufficiently strong spring for catching larger size fish, the latching device must be securely retained in the latching position against the force of the spring. In so doing, the latching device of the attachment in my copending patent application was not entirely sensitive enough for responding to smaller size fish pulling on the fishing line.

Therefore, it is the principal object of the present invention to provide a new and improved hook setting attachment for fishing rods or the like, which fishing attachment is relatively sensitive so as to enable it to be triggered by smaller size fish pulling on the fishing line of the fishing rod.

Briefly, the above and further objects of the present invention are realized by providing a new and improved hook setting attachment, which is adapted to be fixedly connected to a fishing rod. The attachment includes a movable member mounted on an elongated fixed member adapted to be attached to a fishing rod. A line attaching device is mounted on the movable member and is adapted to attach releasably the fishing line to the movable member. A latching device fixes releasably the members in a set position against the force of a spring. A pivotally mounted device retains releasably the latching device in its latching position and subsequently for permitting the latching device to return to its released position to free the two members relative to one another in response to a force applied to the line attaching device via the fishing line so that the movable member returns abruptly relative to the fixed member under the force of the spring to its initial position, thereby jerking backwardly on the fishing line to set the fishhook in place to catch a fish. The pivotally mounted device quickly frees the latching device due to its low friction connection thereto so that the movable member becomes free in response to only a small tensile force applied to the fishing line, thereby enabling the highly sensitive attachment to be triggered by smaller size fish.

BRIEF DESCRIPTION OF THE DRAWINGS

Other objects and advantages of the present invention as well as others will become apparent to those skilled in the art when considered in connection with the accompanying drawings, wherein:

FIG. 1 is a fragmentary right side elevational view of the attachment of the present invention, illustrating it mounted on a fishing rod with the movable member disposed in its set position;

FIG. 2 is a reduced scale plan view of the attachment of FIG. 1;

FIG. 3 is a front elevational view of the attachment of FIG. 1;

FIG. 4 is an enlarged vertical cross-sectional fragmentary view of the attachment of FIG. 1;

FIG. 5 is a plan view of the attachment of FIG. 1, illustrating it with the cover removed and the movable member disposed in its initial position;

FIG. 6 is a bottom plan view of the movable member of the attachment of FIG. 1;

FIG. 7 is a greatly enlarged cross-sectional fragmentary view of a portion of the attachment of FIG. 4;

FIG. 8 is an enlarged detail view of the line attaching device of the movable member, illustrating the device in the process of releasing the fishing line;

FIG. 9 is a vertical fragmentary cross-sectional right side elevational view of another attachment, which is constructed in accordance with the present invention, the view of FIG. 9 being similar to the view shown in FIG. 4; and FIG. 10 is a horizontal fragmentary cross-sectional detail view of the attachment of FIG. 9.

DETAILED DESCRIPTION

Referring now to the drawings, and more particularly to FIGS. 1, 2 and 3 thereof, there is shown a hook setting attachment 10, which is constructed in accordance with the present invention and which is adpated to be fixedly mounted on a fishing pole or rod 12 for pulling abruptly on a fishing line 14 of the rod 12 to set a fishhook (not shown) in the mouth of a fish (not shown). The attachment 10 generally comprises a fixed elongated member 15 having a housing 16 containing a movable member 17 as best seen in FIGS. 5 and 6 of the drawings, which movable member is slidably mounted within the interior of the housing 16 to move back and forth therewithin and is movable by the hand of the user grasping an external actuator 18 extending from the interior of the housing 16 through an elongated opening 19 (FIG. 1), as hereinafter described in greater detail.

In use, as best seen in FIG. 2 of the drawings, an indicator indicia 20 on the upper surface of the actuator 18 designates the position of the movable member 17 relative to the fixed member 15, and, in order to prepare the attachment 10 for setting a hook, the actuator 18 is grasped by the hand of the user and moved from the initial position as shown in FIGS. 2 and 5 of the drawings by holding the fishing rod 12 in one hand and moving forwardly the actuator longitudinally relative to the housing 16 in a forward direction until the indicator 12 is moved to a SET indicia 22 at a forward end portion of the housing 16. At this position, the movable member 17 is latched releasably in position. The fishing line 14 in front of an eyelet 24 of the fishing rod 12 is then pulled backward and attached to the movable member 17 by means of a line attaching device 26 projecting out of the front end portion of the housing 16 as best seen in FIG. 1 of the drawings and mounted on and forming a part of the movable member 17 is a part of the front end portion of the movable member 17 and extends outwardly from the front end portion of the housing 16 when the movable member 17 is disposed in its set position as shown in FIG. 1 of the drawings.

When the movable member 17 is disposed in its set position, a main spring 28 is stretched between the rear end portion of the movable member 17 and the rear end portion of the housing 16, the main spring 28 being partially visible through the opening 19 as shown in FIG. 1 of the drawings. As best seen in FIGS. 4, 6 and 7 of the drawings, a latch 29 secures releasably the movable member 17 in its set position to maintain the main spring 28 in a stretched condition until a fish pulls sufficiently hard on the fishing line 14 to cause the latch to free the movable member 17, whereby the movable member 17 snaps rearwardly under the force of the spring 28 to the initial position as shown in FIGS. 2 and 5 of the drawings, as hereinafter described in greater detail. As shown in FIG. 1 of the drawings, a buzzer 31 generates an attention-attracting signal when a tensile force is applied to the fishing line, and it is energized by an electrical circuit including one or more batteries such as the battery 33, as hereinafter described in greater detail. In this regard, if a fish pulls gently on the fishing line 14 as when a fish typically nibbles at the bait, the buzzer 31 is energized intermittently as hereinafter described in greater detail. When a fish takes the bait and pulls much harder on the fishing line 14, the latch 29 is released to cause the movable member 17 to snap rearwardly and thus to pull abruptly in a rearward direction on the fishing line 14 for setting the hook. The buzzer 31 continues to sound its attention-attracting signal from the time the latch 29 is released until the user pulls rearwardly on the actuator 18 to move the indicia 20 on the actuator 18 opposite an OFF position indicia indicated at 35, as hereinafter described in greater detail, to turn off the buzzer 31 and at the same time free the fishing line 14 from the line retaining device 26 of the movable member 17 so that the line 14 can be reeled in for catching the fish.

Considering now the housing 16 in greater detail, with particular reference to FIGS. 1, 2 and 3 of the drawings, the housing 16 of the fixed member 15 generally comprises an elongated generally L-shaped hollow body 37 having a front U-shaped tail portion 39 and having a rear enlarged portion housing the buzzer 31 and the battery 33. The elongated hollow body 37 is composed of suitable plastic material. A pair of clamps 43 and 45 extend from the underside of the rear enlarged portion 41 for mounting the attachment 10 to the fishing rod 12. A tubelike metal cover 47 telescopes with and partially surrounds the front U-shaped portion 39 and the upper and left hand portion of the rear enlarged portion 41 of the hollow body 37.

As best seen in FIG. 3 of the drawings, the tubelike metal cover 47 includes a horizontal bottom portion 47A extending under approximately half of the front tubelike portion 39 and connected integrally to a left vertical wall portion 47B overlying the left wall 39A of the front U-shaped tail portion 39. At the upper edge of the left wall portion 47B, a top horizontal wall portion 47C is integrally connected thereto to close the open U-shaped tubelike portion 39, the top horizontal wall portion 47C terminating in a downwardly depending right vertical flange portion 47D overlying the right side 39B of the U-shaped portion 39.

A skirt portion 47E extends downwardly on the left side of the open rear enlarged portion 41 to close the buzzzer 31 and the battery 33 compartment 48 as shown in FIG. 1 of the drawings. An access door 48A disposed at the underside of the enlarged portion 41 directly below the battery 33 permits access thereto.

As best seen in FIG. 2 of the drawings, a pair of screws 49 and 50 secure the cover 47 to the hollow body 37, the screw 49 extending through an opening (not shown) in the skirt portion 47E and the screw 50 extending through an opening (not shown) in the top wall portion 47C.

Considering now the clamps 43 and 45 in greater detail, with particular reference to FIGS. 1 and 3 of the drawings, the clamp 45 will now be described, it being understood that the clamp 43 is similar to the clamp 45. The clamp 45 includes a movable jaw 52 which cooperates with a fixed jaw 54 depending from and integrally connected to the rear enlarged portion 41. The jaws 52 and 54 are provided at their lower portions with confronting complementary-shaped curved grooves 56 and 58, respectively, for gripping the fishing rod 12 therebetween near the handle portions (not shown) thereof. A projection 60 on the upper portion of the movable jaw 52 is seated within a complementary-shaped groove or recess 62 in the fixed jaw 54 to serve as a hinge or pivot point for the jaws. A thumbscrew 64 extends through aligned openings (not shown) in the jaws 52 and 54 between the confronting grooves 56 and 58 and the hinge comprising the projection 60 and the groove 62 to clamp releasably the jaws 52 and 54 to the fishing rod 12.

As a result, the clamp 45 is adjustable to fit different size fishing rods. Also, the clamp 45 enables the attachment 10 to be readily mounted on existing fishing rods in a fast and efficient manner.

Considering now the movable member 17 in greater detail, with particular reference to FIGS. 4, 5, 6 and 7 of the drawings, the movable member 17, as best seen in FIG. 6 of the drawings, includes a body 66 having a transverse vertical circular hole 68 for receiving the latch 29, which slides reciprocatively upwardly and downwardly therewithin into and out of a latch groove 71 in the bottom wall of the U-shaped portion 39 as best seen in FIGS. 5 and 7 of the drawings. A spring 73 urges resiliently the latch 29 into the opening 71 and extends within an opening 75 in the latch 29 between the interior thereof and the body 66 of the movable member 17. A bottom bifurcated end portion 76 of the latch 29 has a pair of cam surfaces, such as the cam surface 29A of FIG. 7 of the drawings to cooperate with a surface 71A of the opening 71 so that, when the movable member 17 is slid within the housing 16 to the set position 22, the spring 73 urges the latch 29 into the opening 71 and the inclined cam surface 29A tends to cause the latch 29 to slide out of the opening 71 under the force of the main spring 28 pulling rearwardly on the movable member 17. A rearward inclined portion 71A of the opening 71 enhances the tendency of the latch 29 to back out of the opening 71. A retaining finger 77 pivotally mounted at 79 on the body 66 presses against the upper surface of the latch 29 and retains it releasably in its latched position with the bifurcated portion 76 disposed within the opening 71 and the cam surface 29A mating with the inclined portion 71A of the opening 71. A rearwardly facing curved cam surface 81 of the finger 77 presses against a notched portion 82 of the upper forward portion of the latch 29.

The latch 29 is generally cylindrical in shape and circular in cross sections throughout its length. The bifurcated end portion 76 of the latch 29 straddles a slide bar 83, which, as best seen in FIG. 6 of the drawings, is disposed within an elongated opening 84 communicating with the latch opening 68 and extending on the underside of the body 66. The slide bar 83 slides reciprocatively back and forth within the opening 84.

As best seen in FIG. 7 of the drawings, a notch 85 in the slide bar 83 receives the lower pointed end 86 of the retaining finger 77 so that, when the slide bar 83 moves reciprocatively back and forth within the opening 84 in the underside of the body 66, the bar 83 swings the finger in a pivotal motion about the pivot point 79 as indicated in the broken line showing in FIG. 7 of the drawings. As shown in FIG. 6 of the drawings, the finger 77 is wider than the slide 83 and thus is pulled back and forth with the movement of the slide 83.

The rounded cam surface 81 faces rearwardly and rotates with the finger 77 in a counter-clockwise direction as viewed in FIG. 7 of the drawings toward the position as indicated in broken lines in FIG. 7 to move out of the path of travel of the latch 29, whereby the main spring 28 pulling on the movable member 17 cams the latch 29 out of the opening 71. As a result, the latch 29 backs out of the opening 71 and moves freely past the cam surface 81 so that the movable member 17 can snap rearwardly under the force of the main spring 28. It should be noted that the swinging movement of the finger 77 and the rounded cam surface 81 enables the finger 77 to free the latch 29 in a very rapid manner and provides a very low frictional engagement between the latch 29 and the cam surface 81 of the finger 77; thus, the attachment 10 can be triggered by a very gentle pulling on the fishing line 14 to enable the attachment to assist in the catching of smaller fish.

Considering now the line attaching device 26 in greater detail with particular reference to FIGS. 1, 6 and 8 of the drawings, the line attaching device 26 includes an inclined notch 87 in the front upper surface of the slide bar 83 to form the front end portion of the bar 83 into a hook for receiving the fishing line 14 and thus for pulling it rearwardly when the latch 29 is released. A frontward narrow projection 89 of the body 66 is open at its underside for receiving the slide bar 83, the opening in the projection 89 being an extension of the opening 84. The projection 89 has an opening 90 in the upper side thereof above the notch 87 in the slide bar 83 so that the fishing line 14 extends through the opening 90 and is secured within the notch 87. As shown in FIG. 8 of the drawings, the line 14 is released from the device 26 when the projection 89 moves rearwardly relative to the slide bar 83 to position the slot 87 forming the hook-like front portion under the projection 89 out of alignment with the opening 90 so that the fishing line 14 is then pulled out of the opening 90 as a result of the forward tensile force applied to the fishing line by the fish caught on the end thereof.

As best seen in FIGS. 4 and 7 of the drawings, a sensitivity adjustment mechanism 91 is disposed on the upper front portion of the movable member 17 to enable the user to adjust the amount of tension required to pull on the slide member 83 to release the latch 29. The tension can thus be increased for larger fish. As best seen in FIG. 5 of the drawings, the mechanism 91 includes a compression spring disposed within an opening 93 in the body 66 for resiliently urging the slide bar 83 in a rearward direction. A thumbscrew 94 is journaled for rotation within the body portion 66 and is axially aligned with the coil spring 92 to adjust the tension on the spring 92. A forward projection 96 of the slide bar 83 receives one end of the spring 92 and is seated at its forward end against a nut 98 threaded on a threaded rod 101 of the thumbscrew 94, the nut 98 being generally square in cross section to be non-rotatably captured within the opening 93 so that the nut 98 moves axially and non-rotatably. In this regard, by rotating the screw 94 axially, the threaded rod 101 forming a part thereof causes the nut 98 to move axially non-rotatably therealong to adjust the compressive force acting on the spring 92. Since a forward directed force exerted on the slide bar 83 must overcome the rearwardly directed force applied to the projection 96 of the slide bar 83 by the spring 92, the greater the compressive force exerted on the spring 92 by the nut 98, the greater the force required to pull on the slide bar 83 to move the retaining finger 77 to free the latch 29.

Considering now the manner in which the buzzer 31 is energized to provide an attention-attracting signal, as best seen in FIG. 7 of the drawings, a rear end 103 of the slide bar 83 is resiliently urged rearwardly by the spring 92 into engagement with a movable spring contact 105 (FIG. 6) to maintain it out of engagement with a fixed electrical contact 107 to maintain the electrical circuit to the buzzer 31 in an open condition when the movable member 17 is disposed in its set position. After the latch 29 is released and the movable member 17 is snapped back to the position as shown in FIG. 5 of the drawings, the rear end 103 of the slide bar 83 permits the contacts 105 and 107 to engage one another to complete the electrical circuit to the buzzer 31 and its battery 33 for energizing the buzzer 31. Additionally, it should be understood that, when the movable member 17 is disposed in its set position, a force momentarily applied to the slide bar 83 by the fishing line 14, such as when a fish is merely nibbling at the base, the slide bar 83 is pulled forwardly by a slight amount to enable the spring contact 105 to snap back to its normal position in engagement with the fixed contact 107 to momentarily complete the circuit to the buzzer 31 before the latch is released, whereby the spring 92 then returns the slide bar 83 to its position as indicated in FIG. 7 of the drawings. Thus, momentarily-applied forces applied to the fishing line 14 and the slide bar 83 merely provide intermittent energization of the buzzer 31 to alert the user that a fish is attempting to take the bait and the attachment 10 is not triggered prematurely.

In order to de-energize the buzzer 31 after the latch 29 is released and the movable member 17 snaps back to its position as indicated in FIG. 5 of the drawings, as best seen in FIG. 6 of the drawings, a sliding contact portion 109 of the movable spring contact 105 on the underside of the body 66 slidably engages a conductor strip 111 (FIG. 5) to extend the circuit to the buzzer 31 in the position as shown in FIG. 5 and to open the circuit to the buzzer 31 when the movable member 17 is pulled manually rearwardly to the position as shown in broken lines in FIG. 5 of the drawings so that the sliding contact portion 109 moves rearwardly beyond the end of the conductor strip 111.

As shown in FIG. 5 of the drawings, a sliding contact portion 113 of the fixed contact 107 disposed on the top surface of the body 66 engages the top wall 47C of the cover 47 which is entirely composed of conductive material, such as a suitable metal material.

As best seen in FIG. 1 of the drawings, a pair of battery terminals 115 and 117 engage electrically the opposite terminals of the battery 33, and a lead 119 electrically connects the terminal 117 to one of the inputs to the buzzer 31. A lead 120 connects the other input of the buzzer 31 to a terminal 122, which is electrically connected to the metal cover 47 in any suitable manner to complete the circuit for the buzzer 31.

When the buzzer 31 is energized, an electrical circuit is completed to the buzzer 31, and the electrical circuit includes the lead 119 from one of the inputs to the buzzer 31, the battery terminal 117, the battery 33, the battery terminal 115 connected electrically to the rear end portion of the conductor strip 111, the sliding contact portion 109, the movable contact 105, the fixed contact 107, the sliding contact 113, the metal cover 47, the terminal 122 and the lead 120 which is connected to the other input to the buzzer 31.

As shown in FIG. 5 of the drawings, in order to stop the rearward movement of the movable member 17 in the position as shown in FIG. 5 to enable the buzzer 31 to continue being energized, an abutment 124 at the interior of the hollow body 37 serves as a stop member when the right rounded rearwardly extending finger 126 engages the abutment 124 to bring the movable member 17 to a resting position. A left rounded rearwardly extending finger 128 is spaced from the right finger 126 to form a bifurcated end 130 of the body 66 to enable the body 66 to be moved manually to the rearwardmost position as indicated in broken lines in FIG. 5 in order to de-energize the buzzer 31. In this regard, the bifurcated end 130 moves rearwardly to straddle the post 132 serving to anchor a loop end 134 for the spring 28, which is stretched between the post 132 fixed to the body 37 and a post 135 on the body 66 of the movable member 17. Thus, when the actuator 18 is grasped by the fingers of the user and pulled rearwardly to slide the movable member 17 to its rearwardmost position, the finger 126 rides rearwardly over the abutment 124 and moves to the position as indicated in the broken lines in FIG. 5 straddling the post 132. In this manner, the contact 109 is pulled rearwardly beyond the end 111A of the contact strip 111 to open the circuit to the buzzer 31. A groove 138 extends from the opening 71 toward the latch 29 rearwardly to a position 138A opposite the end 111A of the strip 111, as best seen in FIG. 5 of the drawings, for receiving and guiding the slide bar 83, so that as the movable member 17 is pulled rearwardly from the position as shown in FIG. 5, the slide bar 83 is positioned at the rear end 138A of the slot 138 and thus is prevented from moving further in a rearward position. Hence, the bar 83 remains stationary relative to the movement of the body 66. In so doing, the line attaching device 26 frees the fishing line 14 in the manner as indicated in FIG. 8 of the drawings. As a result, when the actuator 20 is pulled back to the OFF position indicated at 35, the fishing line 14 comes free of the line attaching device 26 and the buzzer 31 is de-activated. It should be noted that the groove 138 is slightly tapered rearwardly from the opening 71 to enable the slide bar 83 to be gripped in place in its rearwardmost position at the end 138A of the slot 138. The end 103 of the slide bar 83 is positioned in the rear end 138A of the groove 138 when the movable member comes to a rest when the spring finger 126 engages the abutment 124.

Referring now to FIGS. 9 and 10 of the drawings, there is shown a hook setting attachment 215, which is constructed in accordance with the present invention, and which is similar to the attachment 10 but is faster to release and thus is an even more sensitive attachment for setting fishhooks. The attachment 215 generally comprises a movable member 217 mounted slidably within a hollow fixed member 119 (FIG. 10) in a similar manner as the fixed and movable members of the attachment 10. A pair of latches 221 and 223 reciprocatively mounted to move in a sideward transverse direction as best seen in FIG. 10. A spring 225 resiliently urges the latches 221 and 223 outwardly apart to retain releasably the movable member 217 in a latched position against the force of a main spring 226 in a manner similar to the latching arrangement of the attachment 10. The latching arrangement of the attachment 215 is more secure than the latching arrangement of the attachment 10 because the attachment 215 employs two separate latches, either one of which being capable to hold the movable member 217 in its latched position.

Each one of the latches 221 and 223 includes an opening, such as the opening 227 in the latch 221 for receiving the spring 225. A pair of latch openings 229 and 230 are disposed oppositely one another in the inside surface of the walls of the fixed member 219 for receiving the respective latches 221 and 223, as best seen in FIG. 10 of the drawings. The latches 221 and 223 have respective cam surfaces 232 and 234 which serve a similar purpose as the cam surface 29A of the latch 29 of the attachment 10. A retaining finger 236 is pivotally mounted at 238 on the movable member 217 and has a projection 240 similar to the cam surface 81 of the finger 77 of the attachment 10 normally disposed between the latches 121 and 123 to retain them releasably in their latched position as best seen in FIG. 10 of the drawings. In order to release the latches, the retaining finger 236 pivots rearwardly about its pivot point 238 until the projection 240 is free of the latches 121 and 123 to enable the main spring 226 to snap the movable member 217 rearwardly in a manner similar to the movable member 17 of the attachment 10.

In order to cause the retaining finger 236 to pivot rearwardly, a permanent magnet 242 is mounted on the lower forward portion of the finger 236 and cooperates with an electromagnet 244 mounted on the body portion of the movable member 217. The confronting faces of the permanent magnet and the electromagnet are of the same polarity so that, when the electromagnet is energized, the permanent magnet 242 is repelled rearwardly away from the electromagnet 244 to carry the finger 236 in a clockwise direction about the pivot point 238 as viewed in FIG. 9 of the drawings, whereby the finger 236 permits the latches 221 and 223 to be cammed out of their latch openings to enable the movable member to snap rearwardly to its final resting position.

The movable member 217 includes an adjustment mechanism 246, which is similar to the adjustment mechanism 91 of the attachment 10. A slide bar 248 serves a similar purpose as the slide bar 83 of the attachment 10.

An electrical spring contact 251 is held out of engagement with a rearwardly projecting portion 253 of an electrical contact 255 by the rear end portion of the slide 248 in a similar manner as the rear end portion of the slide 83 separates the contacts 105 and 107 to open the circuit to the buzzer 31 of the attachment 10. When the slide bar 248 moves forwardly, the contact 251 engages the contact portion 253 to cause a buzzer (not shown) to be energized. The slide 248 continues to move forwardly with a further pulling on the fishing line (not shown) and an abutment 256 on the rear end portion of the slide 248 carries the bottom end portion of the contact 255 into electrical engagement with a fixed contact 255 into electrical engagement with a fixed contact 257 mounted on the body portion of the movable member 217 to complete an electrical circuit to the electromagnet 244 for energizing it to move the finger 236. As the slide 248 continues to move still forwardly, the abutment 256 moves past the spring finger 255 which then is free to snap rearwardly and to maintain electrical contact with the contact 251 for continuing to complete the circuit to the buzzer to alert the user that the fishhook has been set.

Should there be only an intermittent short pulling on the slide bar 248 as in the case of a fish nibbling on the bait, the contacts 251 and 253 make contact with one another only intermittently to provide short repeated buzzing sounds by the buzzer, and the contact 253 is not moved forwardly into engagement with the contact 257 to energize the electromagnet 244.

The embodiments of the invention in which an exclusive property or privilege is claimed are defined as follows:

1. In hook setting apparatus adapted to be connected fixedly to a fishing rod having a fishing line connected at one of its ends and at its other end to a fishhook, a hook setting attachment comprising:
    a fixed elongated member adapted to be attached to the fishing rod;
    a movable member mounted on said fixed member to move between an initial position and a set position;
    line attaching means disposed on said movable member and adapted to be attached releasably to the fishing line;
    means for mounting movably said line attaching means on said movable member for permitting a predetermined free movement between said line attaching means and said movable member;
    main spring means for urging resiliently said movable member to its initial position;
    latching means at least partially disposed at the set position of said movable member for moving reciprocatively in a path of travel into and out of a latching position to fix releasably said movable member in its set position against the force of said spring means;
    returning means at least partially disposed at said set position for helping move said latching means out of its latching position against the force of said main spring means;
    retaining means responsive to said line attaching means for holding releasably said latching means in its latching position against the action of said returning means during relative movement between said line attaching means and said movable member without releasing said latching means and subsequently for permitting said returning means to help move said latching means out of its latching position to free said movable member relative to said fixed member in response to a sufficiently strong force applied to said retaining means via the fishing line to move said retaining means through said predetermined distance relative to said movable member for causing said retaining means to move for freeing said latching means so that said movable member returns abruptly under the force of said main spring means to said initial position, thereby jerking on the fishing line to set the fishhook in place to catch a fish; and
    means for mounting swingably said retaining means to move transversely into and out of said path of travel to enable said retaining means to hold said latching means in its latching position and subsequently permitting said latching means to move reciprocatively out of its latching position.

2. A hook setting attachment according to claim 1, wherein said retaining means includes a finger having cam means for engaging said latching means and extending to said line attaching means for moving it.

3. A hook setting attachment according to claim 2, wherein said latching means includes means defining an opening in one of said fixed and movable members and a latch eciprocatively mounted on one of said fixed and movable members for moving into and out of said opening, said returning means including a cam surface for cooperating with said means defining said opening to enable said latch to move out of said opening under the force of said spring.

4. A hook setting attachment accordint to claim 3, wherein said latching means includes biasing means for urging resiliently said latch into said opening.

5. A hook setting attachment according to claim 1, wherein said movable member includes a body portion and said line attaching means includes an elongated slide bar having a fishing line receiving opening thereon and a front hook portion of said body portion of said movable member for cooperating with the slide bar opening to retain releasably the fishing line.

6. A hook setting attachment adapted to be connected fixedly to a fishing rod having a fishing line connected at one of its ends and at its other end to a fishhook, comprising:
    a fixed elongated member adapted to be attached to the fishing rod;
    a movable member mounted on said fixed member to move between an initial position and a set position;
    line attaching means mounted on said movable member and adapted to be attached releasably to the fishing line;
    main spring means for urging resiliently said movable member to its initial position;
    latching means disposed at the set position of said movable member for moving reciprocatively in a path of travel into and out of a latching position to fix releasably said movable member in its set position against the force of said spring means;
    retaining means responsive to said line attaching means for holding releasably said latching means in its latching position and subsequently for permitting said latching means to free said movable member relative to said fixed member in response to a force applied to said line retaining means via the fishing line so that said members return abruptly under the force of said main spring means to their initial position, thereby jerking on the fishing line to set the fishhook in place to catch a fish;

means for mounting swingably said retaining means to move transversely into and out of said path of travel to enable said retaining means to hold said latching means in its latching position and subsequently permitting said latching means to move reciprocatively out of its latching position;

said movable member includes a body portion and said line attaching means includes an elongated slide bar having a fishing line receiving opening thereon and a front hook portion of said body portion of said movable member for cooperating with the slide bar opening to retain releasably the fishing line; and said line attaching means further includes means defining an elongated groove in said fixed member for receiving said slide bar to guide it therealong, said groove terminating at a rearward position to limit rearward movement of said slide bar relative to said body portion so that said front hook receiving portion of said body portion moves rearwardly relative to said slide bar to free said fishing line.

7. A hook setting attachment according to claim 6, further including attention-attracting means responsive to the completion of an electrical circuit thereto, said circuit including an elongated fixed contact mounted on said fixed member and a slide contact mounted on said body portion of said movable member for engagement with said elongated contact to energize said attention-attracting means so that said body portion can be moved to a rearwardmost position to carry said slide contact beyond and rearwardly away from fixed contact to open said circuit and thus to de-energize said attention-attracting means.

8. A hook setting attachment according to claim 7, further including an abutment on one of said fixed and movable members to limit rearward movement of said movable member relative to said fixed member in response to said main spring means, at least one spring finger means movably mounted on the other one of said fixed and movable members for engaging said abutment means and alternately moving out of engagement with said abutment means to permit said movable member to be moved further to the rear and thus de-energize said attention-attracting means.

9. A hook setting attachment according to claim 7, wherein said circuit further includes switch means responsive to said slide bar to de-energize said attention-attracting means, spring biasing means for urging resiliently said slide bar toward said switch means to maintain it in an open position when said movable member is disposed in its set position and to permit said switch means to complete said circuit for energizing said attention-attracting means in response to said slide bar being pulled away from said switch means by the fishing line either momentarily or steadily, wherein said latching means includes a latch having a bifurcated end portion for straddling said slide bar and having a notched end portion cooperating with said retaining means, said retaining means having an upper rounded cam portion engaging said notched end portion and having a lower pointed portion, said slide bar having a notch disposed therein for receiving said pointed end portion to cause said retaining means to pivot when said slide bar moves back and forth.

10. A hook setting attachment adapted to be connected fixedly to a fishing rod having a fishing line connected at one of its ends and at its other end to a fishhook, comprising:

a fixed elongated member adapted to be attached to the fishing rod;

a movable member mounted on said fixed member to move between an initial position and a set position;

line attaching means mounted on said movable member and adapted to be attached releasably to the fishing line;

main spring means for urging resiliently said movable member to its initial position;

latching means disposed at the set position of said movable member for moving reciprocatively in a path of travel into and out of a latching position to fix releasably said movable member in its set position against the force of said spring means;

retaining means responsive to said line attaching means for holding releasably said latching means in its latching position and subsequently for permitting said latching means to free said movable member relative to said fixed member in response to a force applied to said line retaining means via the fishing line so that said members return abruptly under the force of said main spring means to their initial position, thereby jerking on the fishing line to set the fishhook in place to catch a fish;

means for mounting swingably said retaining means to move transversely into and out of said path of travel to enable said retaining means to hold said latching means in its latching position and subsequently permitting said latching means to move reciprocatively out of its latching position; and a retaining magnet mounted on said latch means and an electro magnet disposed opposite said retaining magnet, the confronting faces of said retaining magnet and said electro magnet being the same polarity so that, when said electro magnet is energized, said retaining magnet is repelled from said electro magnet to cause said retaining means to said latch means, wherein said latch means including a plurality of latches and said retaining means being disposed therebetween.

* * * * *